US012809386B2

(12) United States Patent
Koyama et al.

(10) Patent No.: US 12,809,386 B2
(45) Date of Patent: Nov. 24, 2026

(54) CONTROL DEVICE FOR OMNIDIRECTIONAL VEHICLE

(71) Applicant: Hitachi High-Tech Corporation, Tokyo (JP)

(72) Inventors: Ryo Koyama, Tokyo (JP); Masahiro Koyama, Tokyo (JP); Tomohiro Inoue, Tokyo (JP); Shinichi Ishikawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

(21) Appl. No.: 19/307,597

(22) Filed: Aug. 22, 2025

(65) Prior Publication Data

US 2026/0147348 A1 May 28, 2026

(30) Foreign Application Priority Data

Nov. 22, 2024 (JP) ................................. 2024-203911

(51) Int. Cl.
*G05D 1/244* (2024.01)
*G05D 107/70* (2024.01)

(52) U.S. Cl.
CPC ......... *G05D 1/244* (2024.01); *G05D 2107/70* (2024.01)

(58) Field of Classification Search
CPC ............... G05D 1/244; G05D 2107/70; G05D 2105/28; G05D 2109/10; G05D 2111/10
See application file for complete search history.

(56) References Cited

U.S. PATENT DOCUMENTS

2022/0073105 A1* 3/2022 Osawa .............. B60W 60/0025
2022/0297992 A1* 9/2022 Sonoura .................. B66F 9/063
2024/0427354 A1* 12/2024 Miyamoto ............... G05D 1/80

FOREIGN PATENT DOCUMENTS

JP 2022-81075 A 5/2022

* cited by examiner

*Primary Examiner* — Richard M Camby
(74) *Attorney, Agent, or Firm* — Crowell & Moring LLP

(57) ABSTRACT

The present invention provides a control device adapted to stop, with high accuracy, an omnidirectional vehicle driven by a drive motor irrespective of floor surface properties and the omnidirectional vehicle including the control device. The control device for an omnidirectional vehicle includes: a motor drive command generating section for on-floor mobility characteristic measurement to measure an on-floor mobility characteristic in advance; an on-floor mobility characteristic measuring section; an on-floor mobility characteristic storing section; a moving route executing section to perform route following travel in normal travel; a motor drive command generating section for moving route execution; a stop position error measuring section to perform corrective movement in accordance with the on-floor mobility characteristic after the route following travel; and a motor drive command generating section for corrective movement.

7 Claims, 19 Drawing Sheets

CONTROL DEVICE FOR OMNIDIRECTIONAL VEHICLE

CROSS REFERENCE TO RELATED APPLICATIONS

The present application claims priority from Japanese patent application JP 2024-203911 filed on Nov. 22, 2024, the entire content of which is hereby incorporated by reference into this application.

BACKGROUND

Technical Field

The present invention relates to a control device for an omnidirectional vehicle.

Background Art

Recent labor shortage and work-style reform widely adopted have increased a need for automation and workforce-reduction in various work sites. In particular, omnidirectional vehicles are applied for automation at work sites such as factories or warehouses and used for AGVs (Automatic Guided Vehicles) and AMRs (Autonomous Mobile Robots), and movable collaborative robots. The omnidirectional vehicle can freely move in any direction on a floor, and thus can efficiently move a narrow space or a complicated route. However, some technical problems exist in achieving highly accurate stopping of the omnidirectional vehicle in a target position or direction.

Firstly, the problems are a motor having a dead band in a control input and occurrence of slipping between a moving vehicle and a floor surface. Thus, it is difficult to control with high accuracy a slight movement (around several mm to several cm) in a typical feedback control method. To address such problems, JP 2022-81075 A discloses a control method for removing such an effect of the dead band, but has not yet resolved the problem of the slipping between a moving vehicle and a floor surface.

Secondly, the study conducted by the present inventors has revealed that the dynamic behavior of the omnidirectional vehicle changes depending on the floor surface properties. For example, on a floor surface having a low rigidity made of vinyl chloride, rubber, or the like, the rolling resistance of the wheels is higher as compared to a floor surface having a high rigidity such as an iron plate and the actual moving amount relative to the same speed command is likely to reduce. Because of this, it is effective to change control parameters of a moving control device for each driving environment of the omnidirectional vehicle.

SUMMARY

The present invention has been proposed to solve the aforementioned problems and provides a control device for an omnidirectional vehicle, the control device being adapted to stop, with high accuracy, the omnidirectional vehicle driven by a drive motor irrespective of floor surface properties.

One aspect of the present invention is a control device for an omnidirectional vehicle, the control device being adapted to cause the omnidirectional vehicle to travel to a target stop position of the omnidirectional vehicle, the omnidirectional vehicle having a plurality of omnidirectional wheels that can be independently rotated by a drive motor, the control device including: an motor drive command generating section for on-floor mobility characteristic measurement that generates a drive command to the drive motor for executing mobility characteristic measuring travel to measure a mobility characteristic of the omnidirectional vehicle; an on-floor mobility characteristic measuring section that measures the mobility characteristic of the omnidirectional vehicle through the mobility characteristic measuring travel; an on-floor mobility characteristic storing section that stores the mobility characteristic of the omnidirectional vehicle measured by the on-floor mobility characteristic Measuring section; a moving route executing section that determines a moving route leading to a target stop position of the omnidirectional vehicle in performing normal travel; a motor drive command generating section for moving route execution that generates a drive command for the drive motor to move the omnidirectional vehicle along the moving route determined by the moving route executing section; a stop position error measuring section that measures an error between the target stop position and a stop position that is actual of the omnidirectional vehicle; and a motor drive command generating section for corrective movement that generates a drive command for each wheel of the omnidirectional vehicle to perform movement for correcting the error in the stop position, based on the error in the stop position measured by the stop position error measuring section and the mobility characteristic stored in the on-floor mobility characteristic storing section.

Here, the mobility characteristic is a mathematical model that represents, using mathematical expressions or tables, the relation between a drive command for rotating the drive motor of the omnidirectional vehicle and the actual moving amount.

The drive motor that drives the omnidirectional wheels has a dead band in a control input. Further, while the omnidirectional vehicle is traveling, slipping occurs between the omnidirectional wheels and the floor surface. Therefore, it is difficult to slightly rotate, with high accuracy, the drive motor at standstill. In addition, these phenomena differ depending on the properties of the floor surface where the omnidirectional vehicle travels.

However, it is recognized that the mobility characteristics of the omnidirectional vehicle that are derived from the dead band and the slipping repeatedly appear on identical floor surfaces. Thus, when the mobility characteristics are measured and stored in advance and motor drive commands are appropriately determined in accordance with the stored mobility characteristics, it is possible to cause the omnidirectional vehicle to travel, with high accuracy, to a target stop position. The present invention is configured based on such a finding.

According to the present invention, it is possible to improve the stop accuracy of an omnidirectional vehicle in a target position and direction without being affected by the floor surface properties of a site environment where the omnidirectional vehicle is used. Other features of the present invention will be apparent from the description of the present specification and attached drawings. Further, problems, configurations, and advantageous effects other than those mentioned above will be apparent from the description of the following embodiments.

DETAILED DESCRIPTION

Hereinafter, embodiments of the present invention will be described with reference to the drawings. Note that the embodiments are mere examples for explaining the present invention and do not limit the present invention, and descriptions are omitted and simplified, as appropriate, for clear explanation. The present invention can also be carried out with other various embodiments or a combination of a part or all of those embodiments. Unless otherwise particularly specified, the number of each constituent element may be one or multiple. Further, the embodiments are described by mainly focusing on the differences from the preceding embodiments and the overlapping descriptions are appropriately omitted.

Embodiment 1

Figure 1:
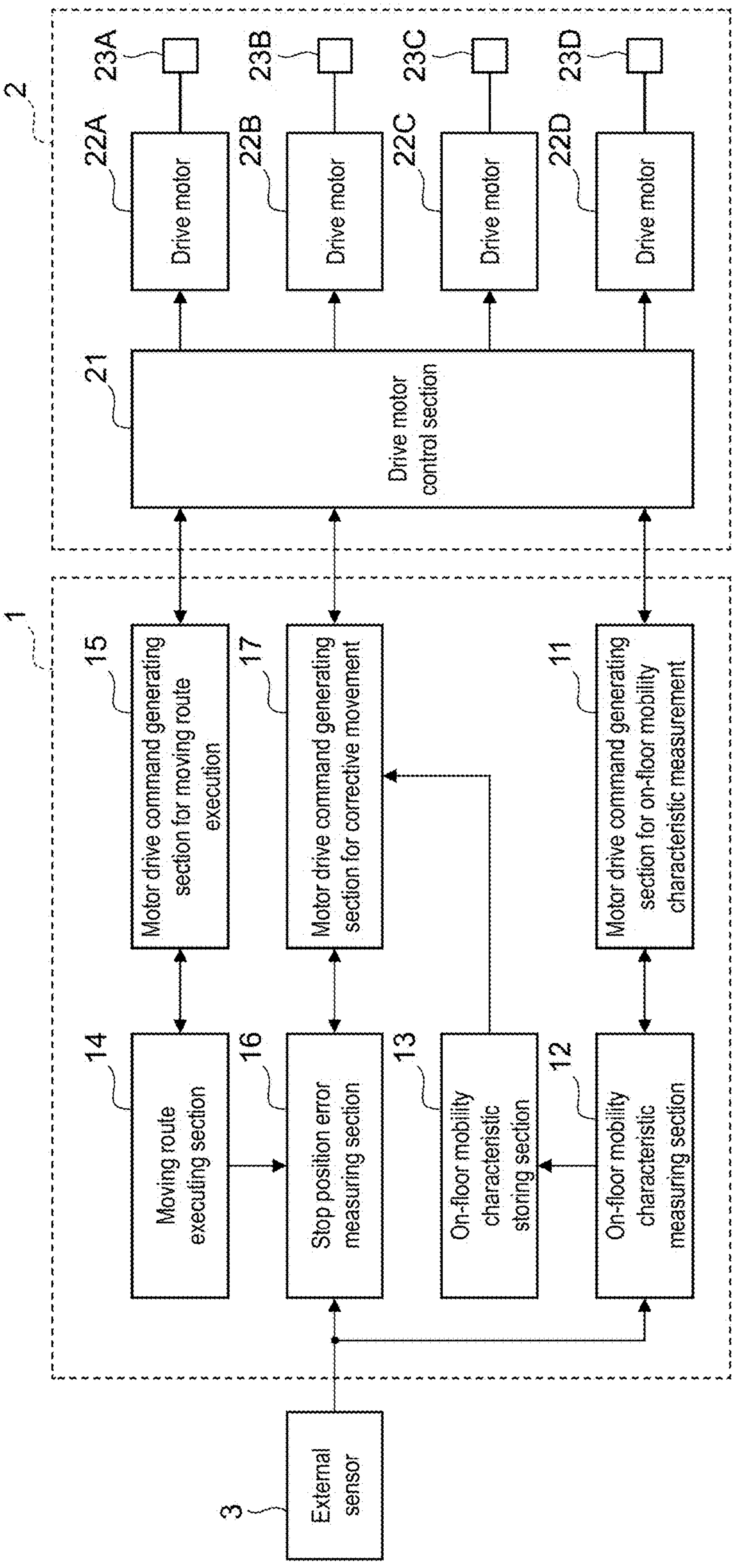
FIG. 1 is a block diagram showing the configuration of a control device for an omnidirectional vehicle according to Embodiment 1 of the present invention.
Figure 2A:
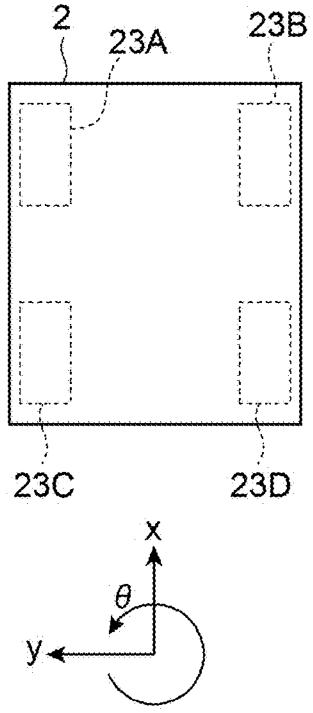
FIGS. 2A to 2C are plan views of an omnidirectional vehicle 2 controlled by the control device for the omnidirectional vehicle according to Embodiment 1 of the present invention.
Figure 2B:
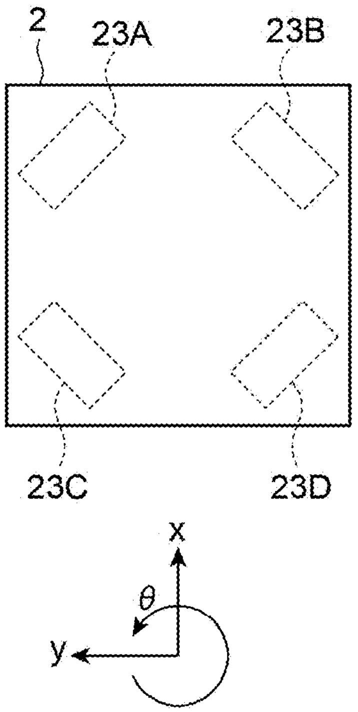

FIG. 1 is a block diagram showing the configuration of a control device for an omnidirectional vehicle according to Embodiment 1 of the present invention, and FIG. 2 is a plan view of an omnidirectional vehicle 2 controlled by the control device for the omnidirectional vehicle according to Embodiment 1 of the present invention.

In FIG. 1, the control device 1 of the present embodiment is connected to the omnidirectional vehicle 2 and an external sensor 3. The control device 1 of the present embodiment of FIG. 1 is mounted on the omnidirectional vehicle 2 as illustrated in FIG. 2. The omnidirectional vehicle 2 is a vehicle freely movable on a floor surface in three directions of a front-back direction (x-axis direction of FIG. 2), a left-right direction (y-axis direction of FIG. 2), and a turning direction (θ direction of FIG. 2).

Figure 2C:
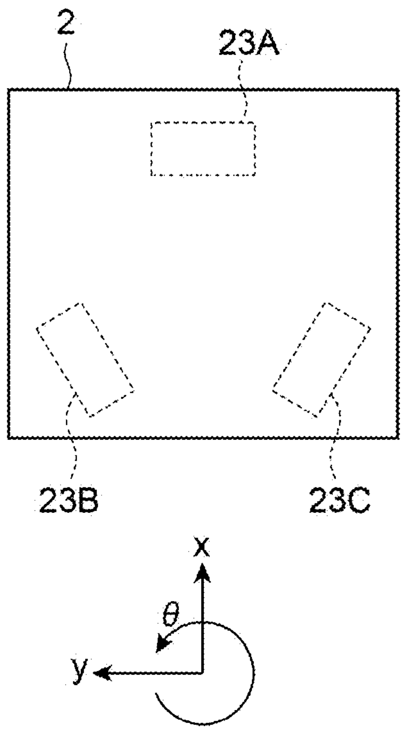

The omnidirectional vehicle includes a plurality of omnidirectional wheels individually rotatable by a drive motor. As the omnidirectional vehicle 2, a four-wheel Mecanum wheel system of FIG. 2A, a four-wheel omni wheel system of FIG. 2B, and a three-wheel omni wheel system of FIG. 2C are illustrated. FIG. 1 shows a configuration example of the four-wheel Mecanum wheel system and the following description of the embodiment is made by having the four-wheel Mecanum wheel system as an example.

The omnidirectional vehicle 2 includes independently driven omnidirectional wheels 23A to 23D, which are driven by drive motors 22A to 22D, respectively. The drive motors 22A to 22D are controlled by a drive motor control section 21. The drive motors 22A to 22D are, for example, a three-phase motor and a brushless motor that can control speed. Alternatively, the drive motors 22A to 22D may be a servo motor capable of performing position control.

Figure 3:
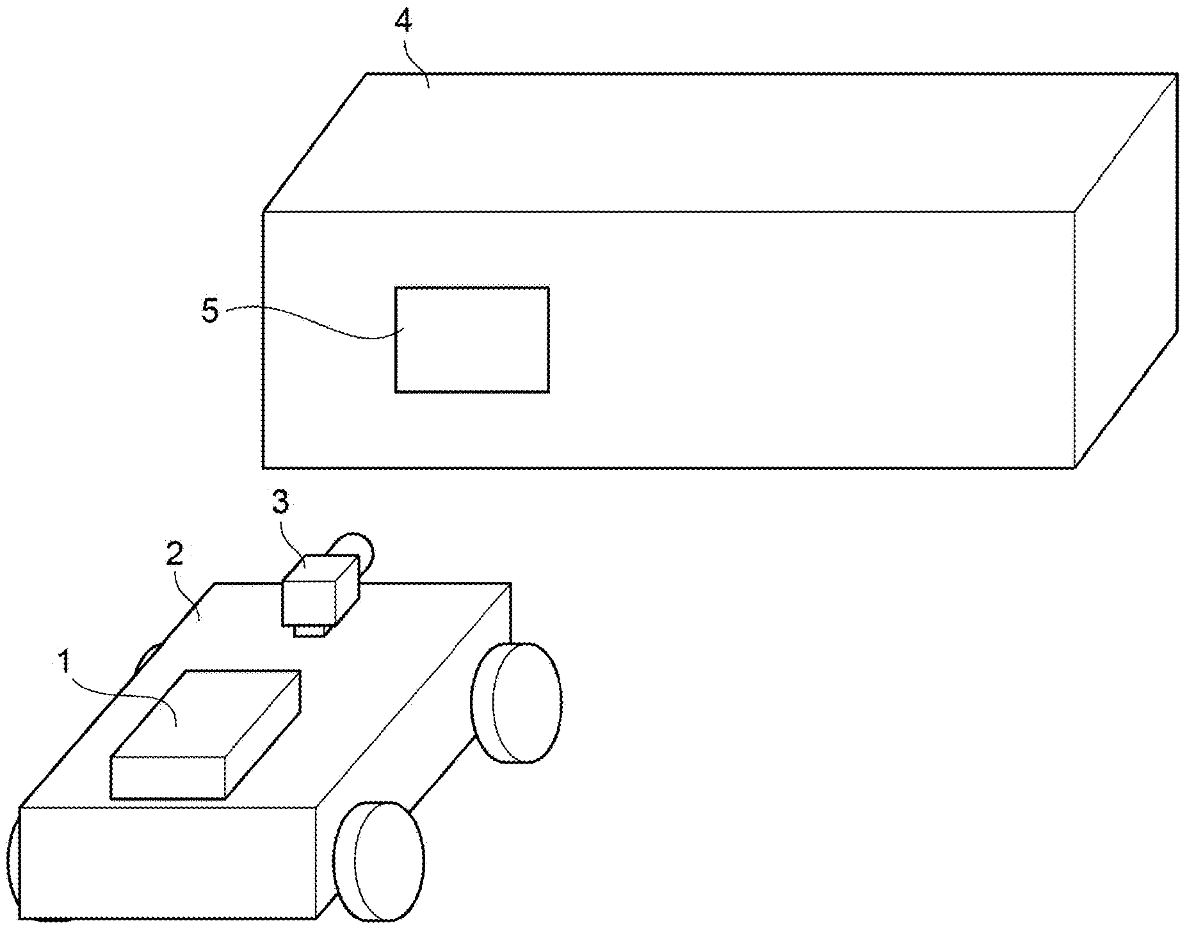
FIG. 3 is a view for showing a state when the omnidirectional vehicle according to Embodiment 1 of the present invention measures a stop position error at a work site.

FIG. 3 is a view for showing a state when the omnidirectional vehicle according to Embodiment 1 of the present invention measures a stop position error at a work site.

The external sensor 3 is, for example, a monocular camera and captures an image of a position measurement marker 5 having a specific pattern that is installed in a surrounding structure 4 as shown in FIG. 3. Note that the external sensor 3 may be a compound eye camera. The external sensor 3 may be LiDAR (Light Detection and Ranging) or a depth camera capable of acquiring a depth image, in which case, the position measurement marker 5 is a three-dimensional object having a specific shape. The external sensor 3 may be a compound eye infrared camera, in which case, the position measurement marker 5 is a predetermined structure having a high infrared reflectivity.

The control device 1 is a computer composed of a processor, a memory, a storage, a network I/F (Interface), and the like. After receiving sensor data acquired by the external sensor 3 and subjecting it to information processing, the control device 1 outputs a motor drive command to the drive motor control section 21 so as to control the drive motors 22A to 22D.

Figure 4:
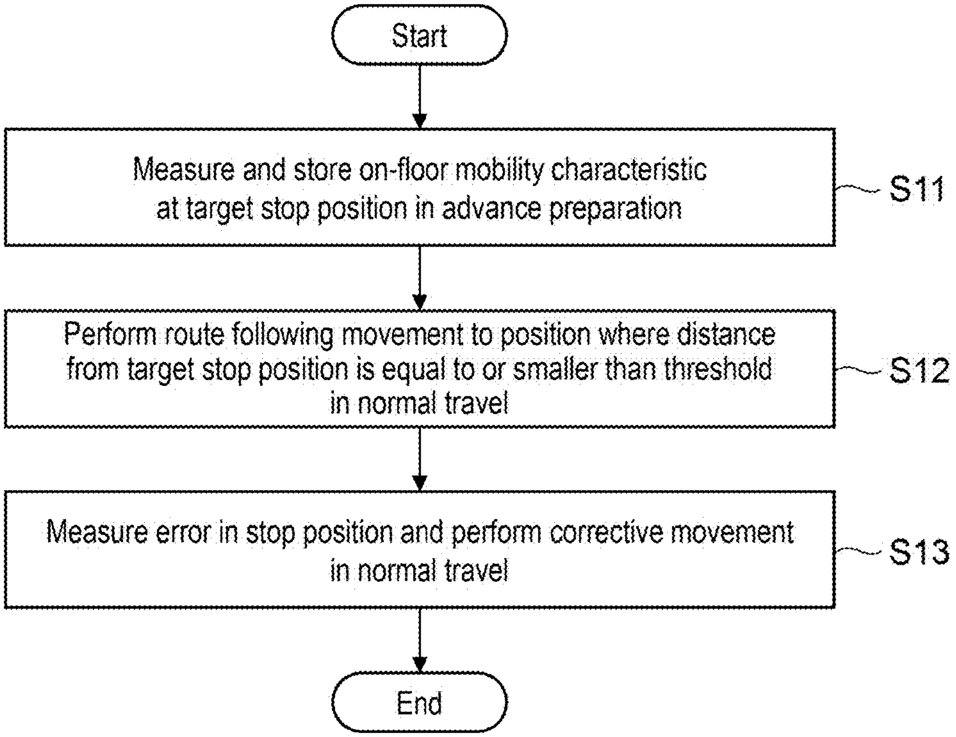
FIG. 4 is a flowchart showing the order in which the control device 1 for the omnidirectional vehicle according to Embodiment 1 of the present invention implements a function.

FIG. 4 is a flowchart showing the order in which the control device 1 for the omnidirectional vehicle exhibits a function.

First, in an advance preparation phase, the control device 1 performs on-floor mobility characteristic measurement (S11). Then, in a normal travel phase, after performing route following movement (S12), the control device 1 performs corrective movement (S13), so that stopping with high accuracy at a target stop position is implemented.

Returning to FIG. 1, for implementing the three functions of the aforementioned on-floor mobility characteristic measurement (S11), route following movement (S12), and corrective movement (S13), the control device 1 includes a motor drive command generating section 11 for on-floor mobility characteristic measurement, an on-floor mobility characteristic measuring section 12, an on-floor mobility characteristic storing section 13, a moving route executing section 14, a motor drive command generating section 15 for moving route execution, a stop position error measuring section 16, and a motor drive command generating section 17 for corrective movement.

The motor drive command generating section 11 for on-floor mobility characteristic measurement generates a drive command to measure the mobility characteristic of the omnidirectional vehicle 2 that is represented by the relation between a drive command for rotating the drive motor of the omnidirectional vehicle 2 and the actual moving amount. The on-floor mobility characteristic measuring section 12 measures the mobility characteristic of the omnidirectional vehicle. The on-floor mobility characteristic storing section 13 stores the mobility characteristic of the omnidirectional vehicle 2 that has been measured by the on-floor mobility characteristic measuring section 12. The moving route executing section 14 determines a moving route leading to a target stop position of the omnidirectional vehicle 2.

The motor drive command generating section 15 for moving route execution generates a drive command for the drive motor to move the omnidirectional vehicle 2 along the moving route determined by the moving route executing section 14. The stop position error measuring section 16 measures an error between the target stop position and an actual stop position of the omnidirectional vehicle 2. The motor drive command generating section 17 for corrective movement generates a drive command for each wheel to perform movement for correcting the error in the stop position, based on the error in the stop position measured by the stop position error measuring section 16 and the mobility characteristic stored in the on-floor mobility characteristic storing section 13.

Figure 5:
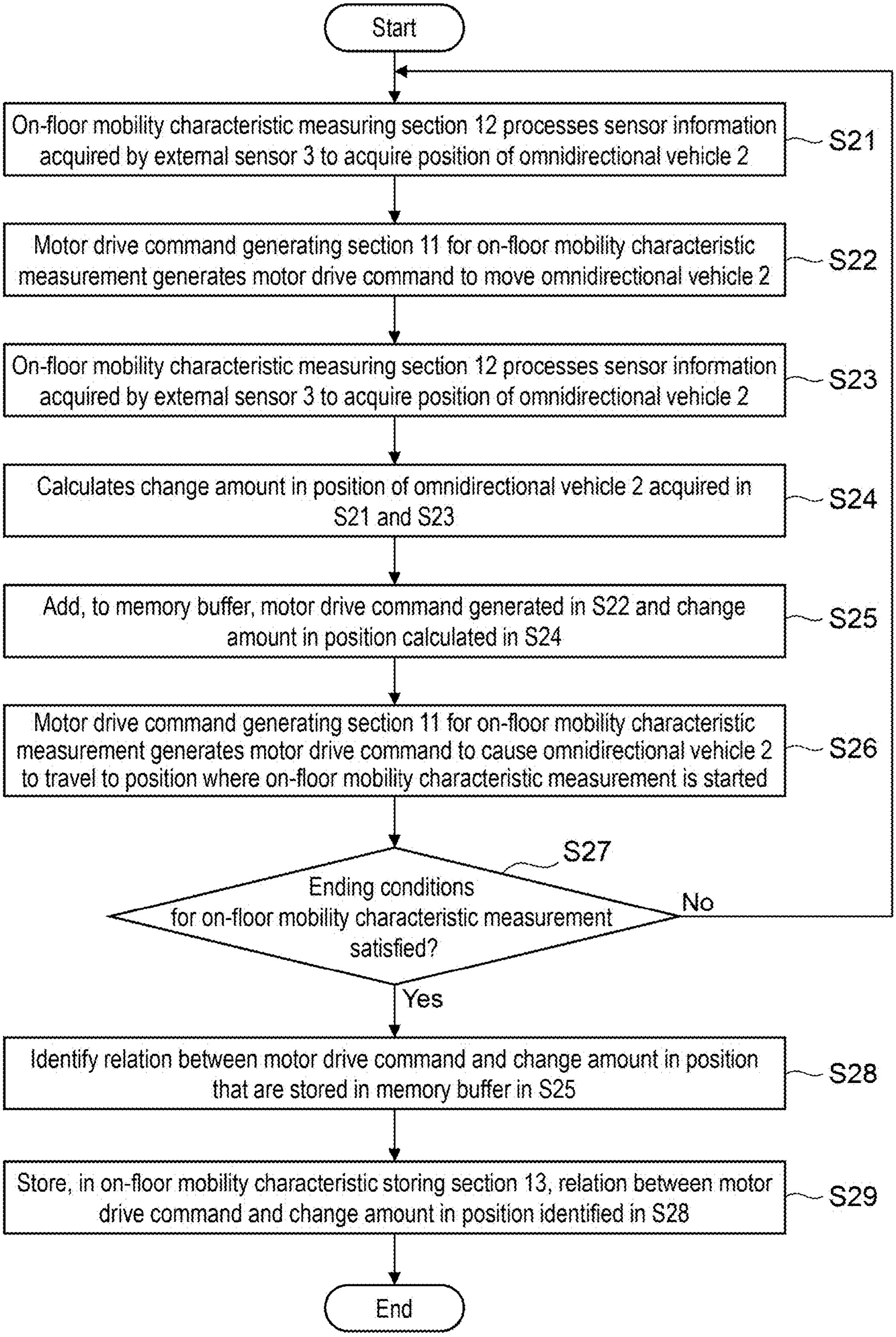
FIG. 5 is a flowchart showing a method in which the control device 1 for the omnidirectional vehicle according to Embodiment 1 of the present invention implements an on-floor mobility characteristic measuring function.

FIG. 5 is a flowchart showing processing of the control device 1 for the omnidirectional vehicle performing the on-floor mobility characteristic measurement (S11 of FIG. 4).

First, the on-floor mobility characteristic measuring section 12 processes the sensor information acquired by the external sensor 3 to acquire the position of the omnidirectional vehicle 2 (S21). Subsequently, the motor drive command generating section 11 for on-floor mobility characteristic measurement generates a motor drive command to move the omnidirectional vehicle 2 (S22). After the moving ends, the on-floor mobility characteristic measuring section 12 processes the sensor information acquired by the external sensor 3 to acquire the position of the omnidirectional vehicle 2 (S23). Then, the change amount in the position of the omnidirectional vehicle 2 acquired in S21 and S23 is calculated (S24), and the motor drive command generated in S22 and the change amount in the position calculated in S24 are added to a memory buffer (S25).

In order to return the omnidirectional vehicle 2 to an initial position, the motor drive command generating section 11 for on-floor mobility characteristic measurement generates a motor drive command to cause the omnidirectional vehicle 2 to travel to a position where the on-floor mobility characteristic measurement is started (S26). It is determined whether the ending conditions for the on-floor mobility characteristic measurement are satisfied, and when the ending conditions are not satisfied, the process returns to S21 and when the ending conditions are satisfied, the process proceeds to the next operation (S27).

The relation between the motor drive command and the change amount in the position that are stored in the memory buffer in S25 is identified using a multiple regression analysis or the like (S28), and the relation between the motor drive command and the change amount in the position identified in S28 is stored in the on-floor mobility characteristic storing section 13 (S29). The relation between the motor drive command and the change amount in the position identified in S28 is the mobility characteristic of the floor surface where the measurement is performed and is referred to as on-floor mobility characteristic measurement.

Figure 6:
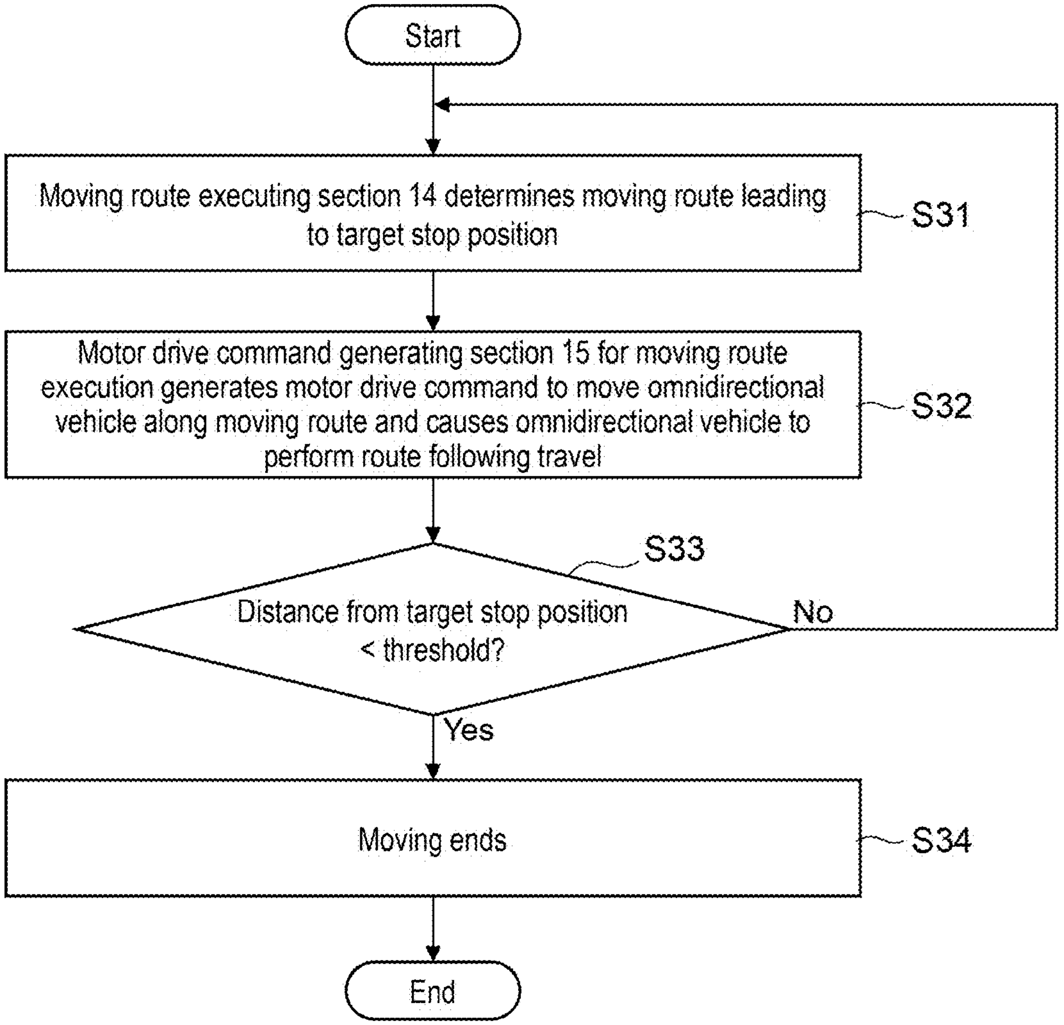
FIG. 6 is a flowchart showing a method in which the control device 1 for the omnidirectional vehicle according to Embodiment 1 of the present invention implements a route following movement function.

FIG. 6 is a flowchart showing a method in which the control device 1 for the omnidirectional vehicle according to Embodiment 1 of the present invention implements a route following movement function. FIG. 6 shows processing of the control device 1 performing the moving route execution (S12 of FIG. 4).

First, the moving route executing section 14 determines a moving route leading to a target stop position (S31). The motor drive command generating section 15 for moving route execution generates a motor drive command to move the omnidirectional vehicle along the moving route and causes the omnidirectional vehicle 2 to perform route following travel (S32). When the distance between the target stop position and the omnidirectional vehicle 2 is smaller than a threshold (S33), the moving ends (S34), and otherwise, the process returns to S31.

Figure 7:
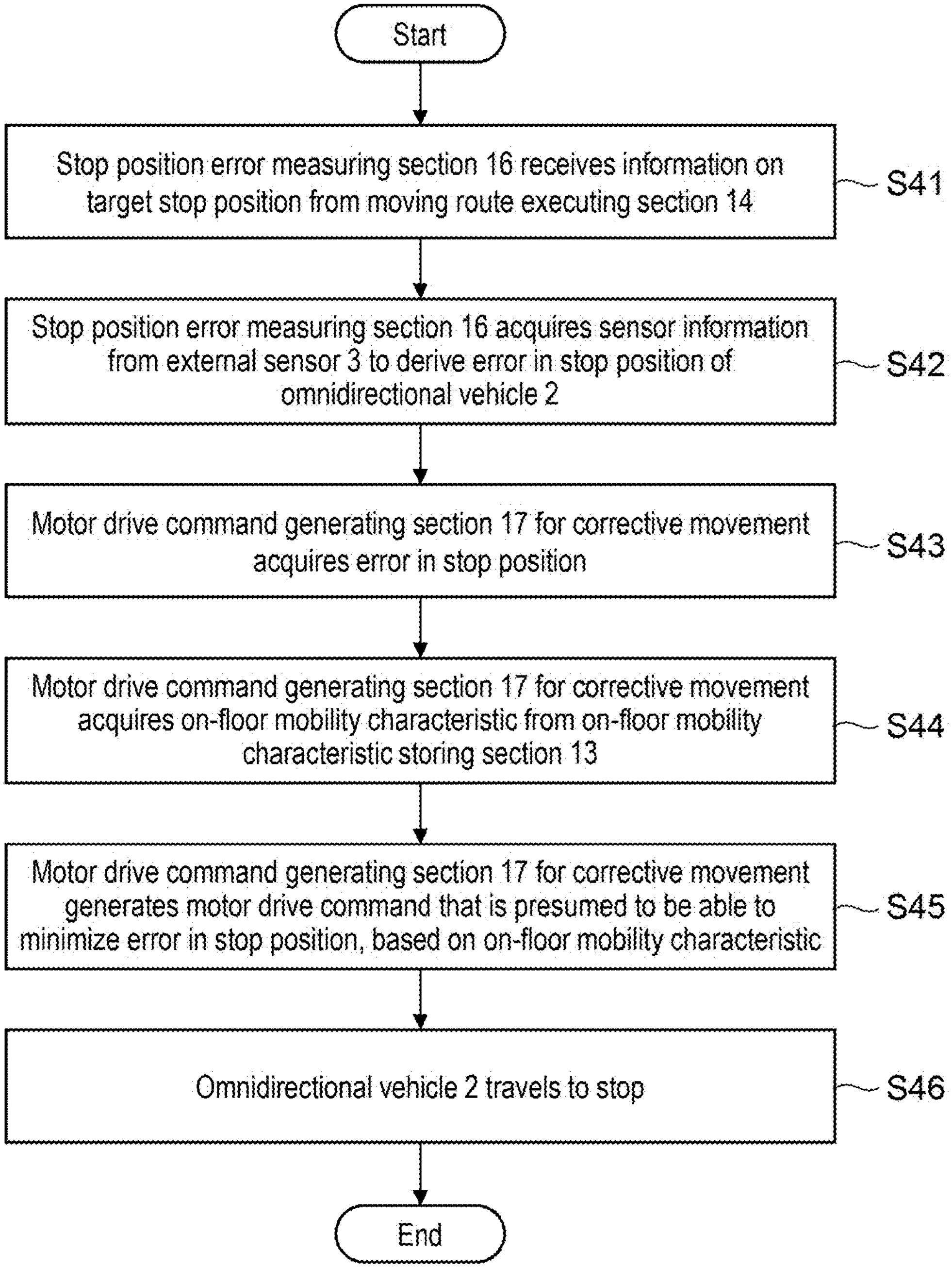
FIG. 7 is a flowchart showing a method in which the control device 1 for the omnidirectional vehicle according to Embodiment 1 of the present invention implements a corrective movement function.

FIG. 7 is a flowchart showing a method in which the control device 1 for the omnidirectional vehicle according to Embodiment 1 of the present invention implements a corrective movement function. FIG. 7 shows processing of the control device 1 performing the corrective movement (S13 of FIG. 4).

The stop position error measuring section 16 receives information on the target stop position from the moving route executing section 14 (S41). The stop position error measuring section 16 acquires sensor information from the external sensor 3 to derive an error in the stop position of the omnidirectional vehicle 2 (S42). The motor drive command generating section 17 for corrective movement acquires the error in the stop position from the stop position error measuring section 16 (S43). The motor drive command generating section 17 for corrective movement acquires the on-floor mobility characteristic from the on-floor mobility characteristic storing section 13 (S44). The motor drive command generating section 17 for corrective movement generates a drive command for each wheel to perform movement for correcting the error in the stop position, based on the error in the stop position measured by the stop position error measuring section 16 and the mobility characteristic stored in the on-floor mobility characteristic storing section 13. The motor drive command generating section 17 for corrective movement generates, as a drive command for each wheel, a motor drive command that is presumed to be able to minimize the error in the stop position, based on the on-floor mobility characteristic (S45), and outputs a corrective movement motor drive command to the drive motor control section 21 of the omnidirectional vehicle 2 to cause the omnidirectional vehicle 2 to travel to stop (S46).

Embodiment 2

Figure 8:
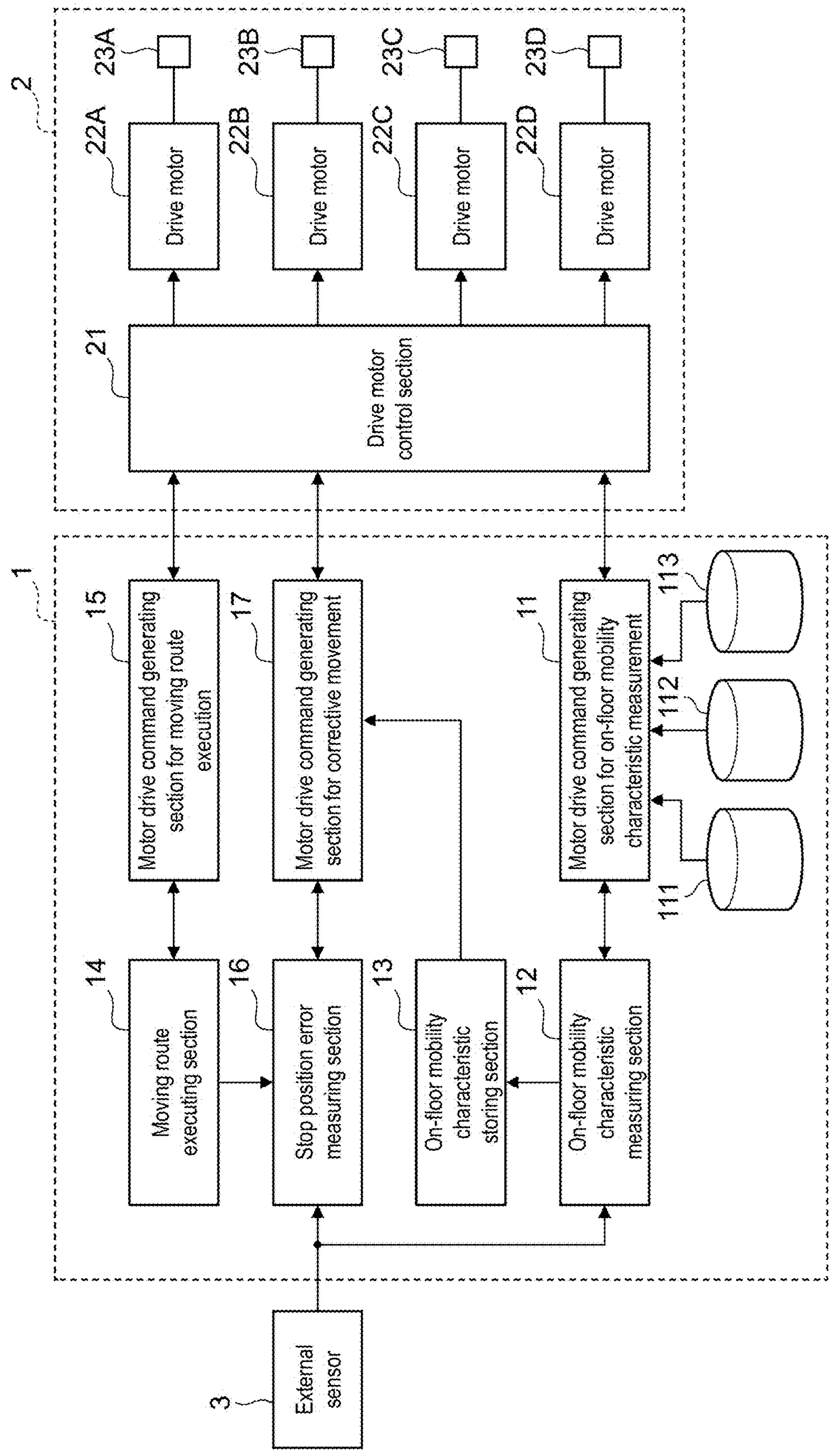
FIG. 8 is a block diagram showing the configuration of the control device 1 for the omnidirectional vehicle according to Embodiment 2 of the present invention.
Figure 9:
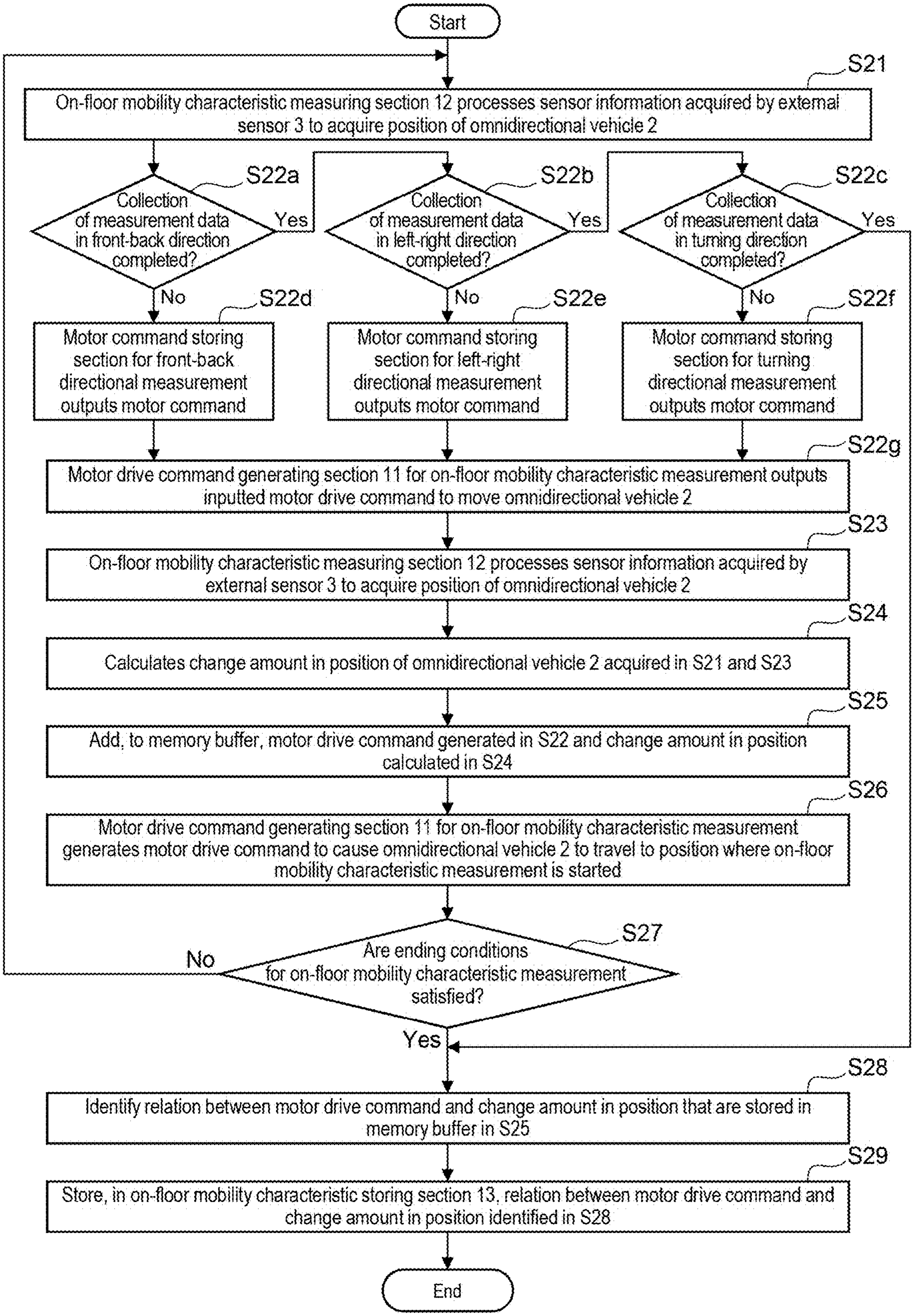
FIG. 9 is a flowchart showing a method in which the control device 1 for the omnidirectional vehicle according to Embodiment 2 of the present invention implements the on-floor mobility characteristic measuring function.

FIG. 8 is a block diagram showing the configuration of the control device 1 for the omnidirectional vehicle according to Embodiment 2 of the present invention and FIG. 9 is a flowchart showing a method in which the control device 1 for the omnidirectional vehicle according to Embodiment 2 of the present invention implements the on-floor mobility characteristic measuring function.

In the control device 1, it is important to improve the identification accuracy for the on-floor mobility characteristic for improved stop accuracy of the omnidirectional vehicle 2. In the omnidirectional vehicle including the omnidirectional wheels illustrated in FIG. 2, in general, the dynamic characteristics differ depending on the moving direction, such as a front-back direction, a left-right direction, and a turning direction. This is because the omnidirectional wheels such as the Mecanum wheels and omni-wheels have a structure in which small rollers are arranged in such an encircling manner on the surface of the wheels and the position and the number of the rotating rollers change depending on the advancing direction of the omnidirectional vehicle. The present embodiment discloses a method for on-floor mobility characteristic measurement found in view of such characteristics of the omnidirectional vehicle.

The control device 1 of the present embodiment includes, in addition to the constituent elements described in Embodiment 1, a motor command storing section 111 for front-back directional measurement, a motor command storing section 112 for left-right directional measurement, and a motor command storing section 113 for turning directional measurement. The motor command storing section 111 for front-back directional measurement stores a speed command for the drive motor to measure a mobility characteristic of a front-back directional movement. The motor command storing section 112 for left-right directional measurement stores a speed command for the drive motor to measure a mobility characteristic of a left-right directional movement. The motor command storing section 113 for turning directional measurement stores a speed command for the drive motor to measure a mobility characteristic of a turning directional movement. The motor drive command generating section 11 for on-floor mobility characteristic measurement separately outputs motor commands that are stored in the motor command storing section 111 for front-back directional measurement, the motor command storing section 112 for left-right directional measurement, and the motor command storing section 113 for turning directional measurement.

FIG. 9 shows processing of the control device 1 of Embodiment 2 performing the on-floor mobility characteristic measurement. S21, S23, S24, S25, S26, S27, S28, and S29 are the same as those of FIG. 5, but the aspect in which the motor drive command generating section 11 for on-floor mobility characteristic measurement generates the motor drive command is made more specific.

After the on-floor mobility characteristic measuring section 12 processes the sensor information acquired by the external sensor 3 to acquire the position of the omnidirectional vehicle 2 (S21), the motor drive command generating section 11 for on-floor mobility characteristic measurement determines whether collection has been completed, individually for the measurement data in the front-back direction, the left-right direction, and the turning direction (S22*a*, S22*b*, S22*c*).

For the direction for which the collection of measurement data is not completed (S22*d*, S22*e*, S22*f*), the motor drive command generating section 11 for on-floor mobility characteristic measurement acquires a motor command value to measure the mobility characteristic stored in advance in the motor command storing section 111 for front-back directional measurement, the motor command storing section 112 for left-right directional measurement, or the motor command storing section 113 for turning directional measurement to move the omnidirectional vehicle 2. That is, the motor drive command generating section 11 for on-floor mobility characteristic measurement individually outputs the motor commands stored in the motor command storing section 111 for front-back directional measurement, the motor command storing section 112 for left-right directional measurement, and the motor command storing section 113 for turning directional measurement. This method is characterized in that the on-floor mobility characteristic measurement is individually identified for each of the front-back direction, the left-right direction, and the turning direction. This enables highly accurate control of the omnidirectional vehicle 2 having different dynamic characteristics depending on the moving direction.

Embodiment 3

Figure 10:
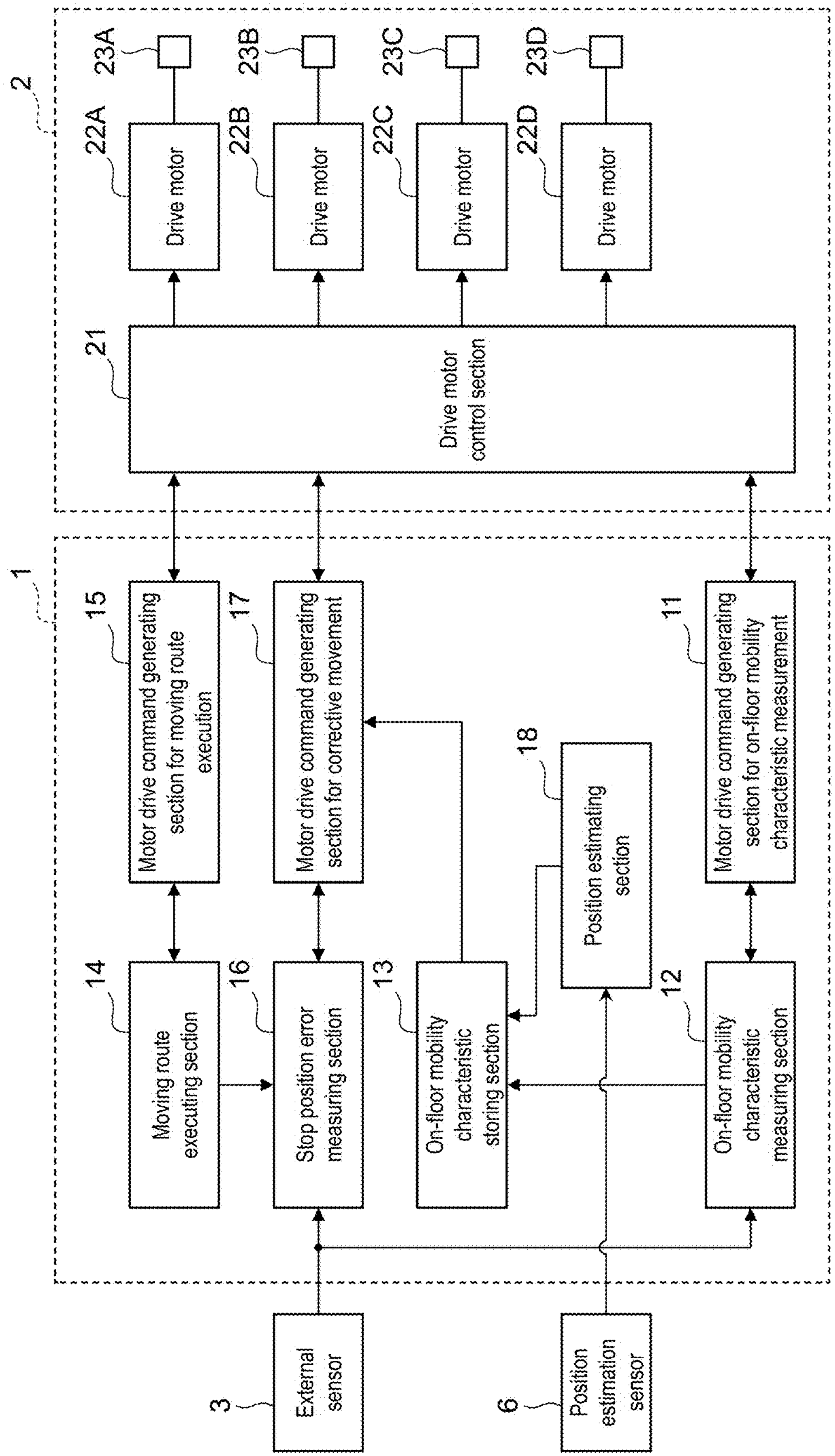
FIG. 10 is a block diagram showing the configuration of the control device 1 for the omnidirectional vehicle according to Embodiment 3 of the present invention.

FIG. 10 is a block diagram showing the configuration of the control device 1 for the omnidirectional vehicle according to Embodiment 3 of the present invention.

The range where the omnidirectional vehicle 2 travels occasionally includes a plurality of regions having different floor properties. In such circumferences, when corrective movement is performed by having one on-floor mobility characteristic assumed, a significant stop error could occur due to a discrepancy between the on-floor mobility characteristic that the motor drive command generating section 17 for corrective movement acquires from the on-floor mobility characteristic storing section 13 to generate the motor command and the actual on-floor mobility characteristic. The present embodiment aims to prevent such a problem.

FIG. 10 shows the configuration of the control device 1 of Embodiment 3.

The control device 1 of the present embodiment includes, in addition to the constituent elements described in Embodiment 1, a position estimation sensor 6 and a position estimating section 18. The position estimation sensor 6 is, for example, a LiDAR sensor. The position estimating section 18 processes the sensor information acquired from the position estimation sensor 6 to estimate and output the current position of the omnidirectional vehicle 2.

The on-floor mobility characteristic storing section 13 in the present embodiment stores the on-floor mobility characteristic so as to be associated with a position of the omnidirectional vehicle 2 when the on-floor mobility characteristic is measured. When the control device 1 performs the corrective movement, the motor drive command generating section 17 for corrective movement generates a motor drive command for the corrective movement using the on-floor mobility characteristic measured at a position closest to the target stop position among the on-floor mobility characteristics stored in the on-floor mobility characteristic storing section 13. As a result, even when the target stop position has different floor properties, accurate corrective movement based on the on-floor mobility characteristic is available in advance for each target stop position so that the stop accuracy is improved.

Embodiment 4

Figure 11:
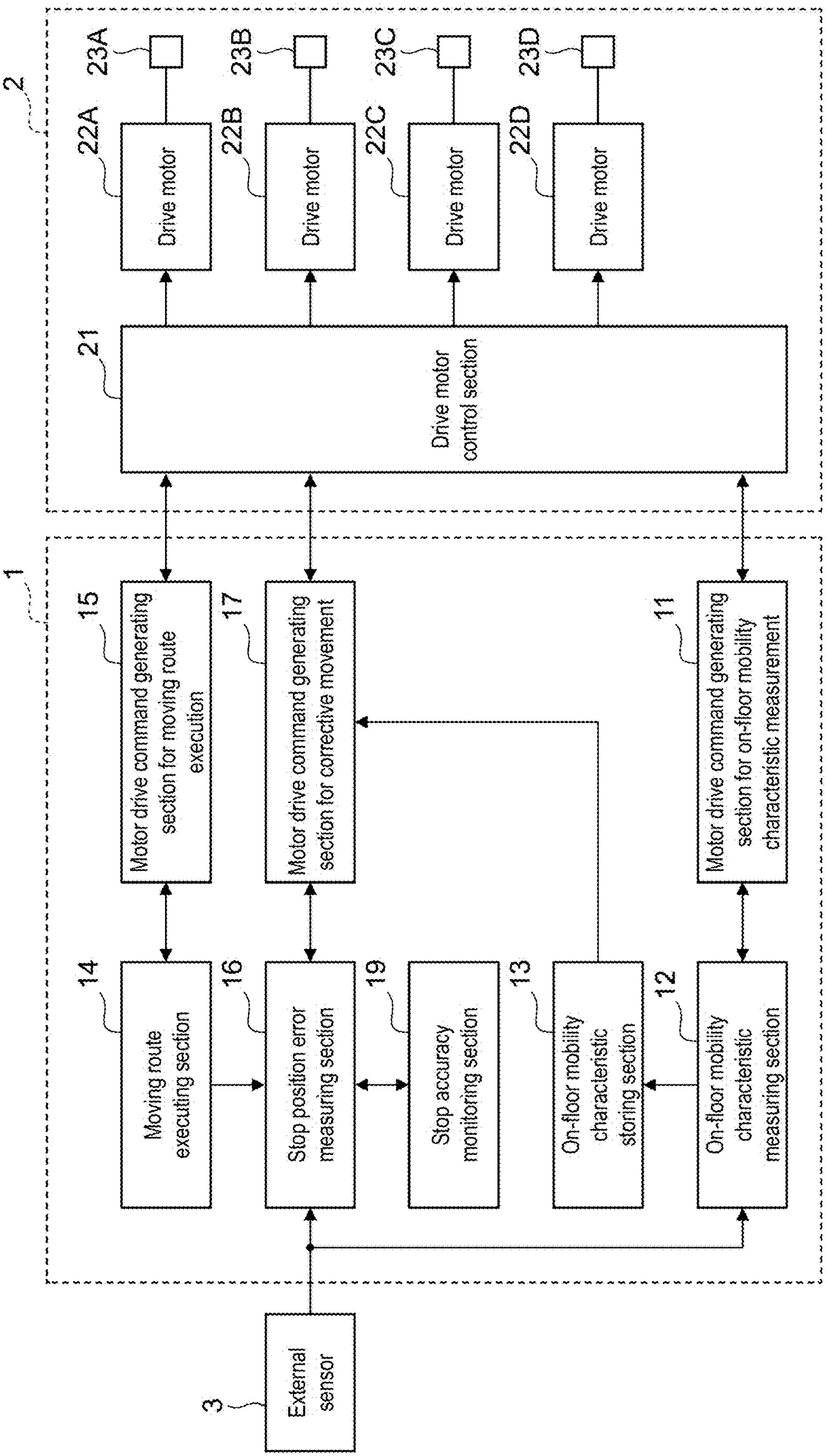
FIG. 11 is a block diagram showing the configuration of the control device 1 for the omnidirectional vehicle according to Embodiment 4 of the present invention.
Figure 12:
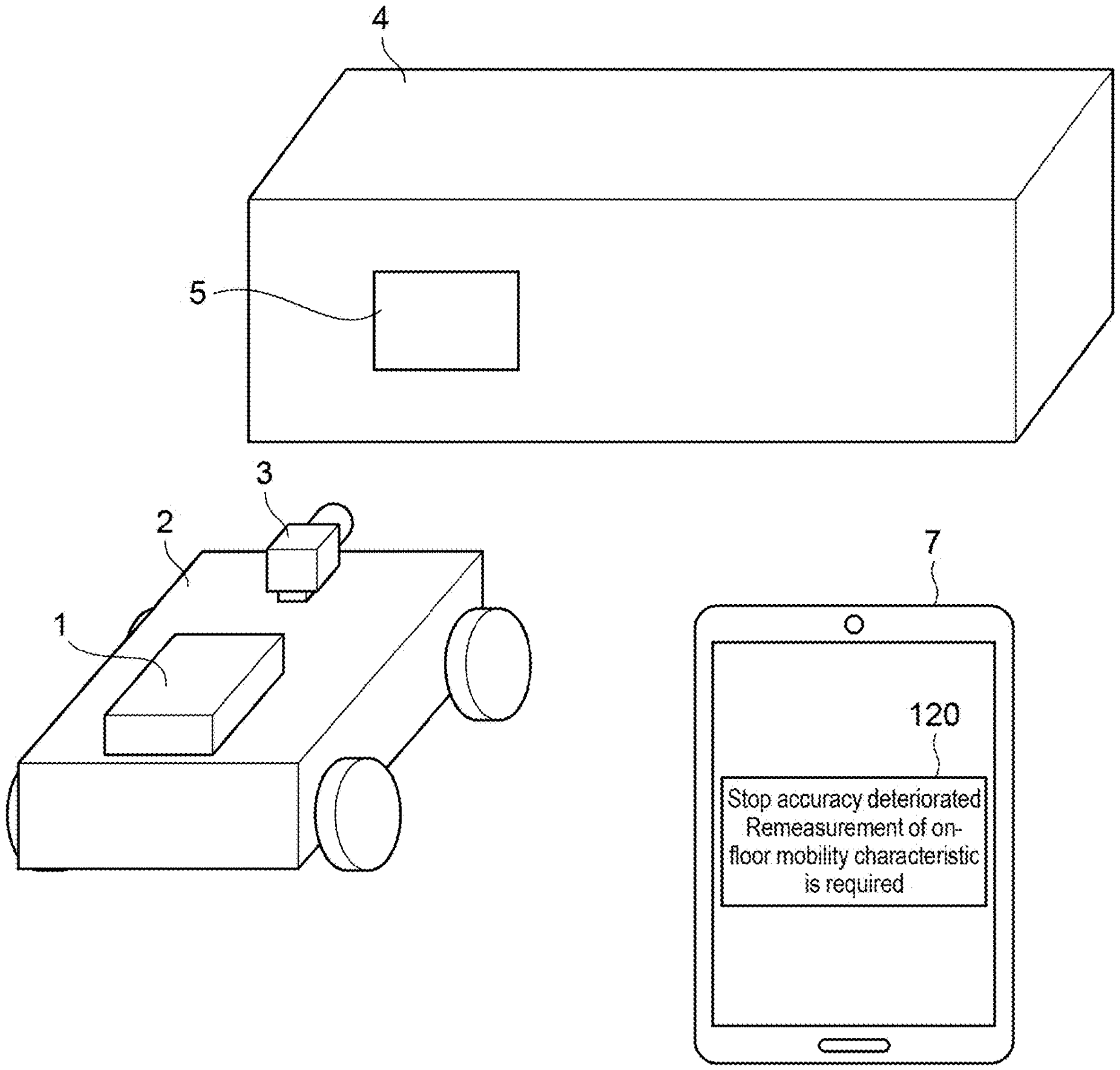
FIG. 12 is a view for showing a state in which a stop accuracy monitoring section of the control device 1 for the omnidirectional vehicle according to Embodiment 4 of the present invention urges a user to reimplement on-floor mobility characteristic measurement.

FIG. 11 is a block diagram showing the configuration of the control device 1 for the omnidirectional vehicle according to Embodiment 4 of the present invention, and FIG. 12 is a view for showing a state in which a stop accuracy monitoring section of the control device 1 for the omnidirectional vehicle according to Embodiment 4 of the present invention urges a user to reimplement on-floor mobility characteristic measurement.

FIG. 11 shows the configuration of the control device 1 of Embodiment 4. The control device 1 of the present embodiment includes a stop accuracy monitoring section 19 in addition to the constituent elements described in Embodiment 1.

The on-floor mobility characteristic changes due to stains on or deterioration of the floor surface or aged deterioration of the omnidirectional vehicle 2 itself. Immediately after the measurement of the on-floor mobility characteristic, stopping with high accuracy at a target stop position is feasible, but after a long period of time elapses, the same stop accuracy cannot be maintained in some cases. The present embodiment aims to address such a problem.

Noting that after the normal travel of the omnidirectional vehicle 2, a stop error after the corrective movement can be measured by the stop position error measuring section 16, the present embodiment includes the stop accuracy monitoring section 19 shown in FIG. 11. The stop accuracy monitoring section 19 acquires, after the corrective movement, the error in the stop position that is output by the stop position error measuring section 16, compares the error in the stop position with a predetermined threshold, and notifies that the on-floor mobility characteristic at the position should be measured when the error in the stop position is greater than the threshold.

FIG. 12 schematically shows a state in which the stop accuracy monitoring section 19 detects deterioration of stop accuracy and notifies a user that the on-floor mobility characteristic needs to be remeasured. In the present embodiment, the control device 1 exchanges information with a tablet terminal 7 that the user has, using a wireless communication means (not shown). Further, it is possible to cause a stop accuracy deterioration displaying section 120 of the tablet terminal 7 to display that the stop accuracy at the target stop position of the omnidirectional vehicle 2 is deteriorated and remeasurement of the on-floor mobility characteristic is urged.

Embodiment 5

Figure 13:
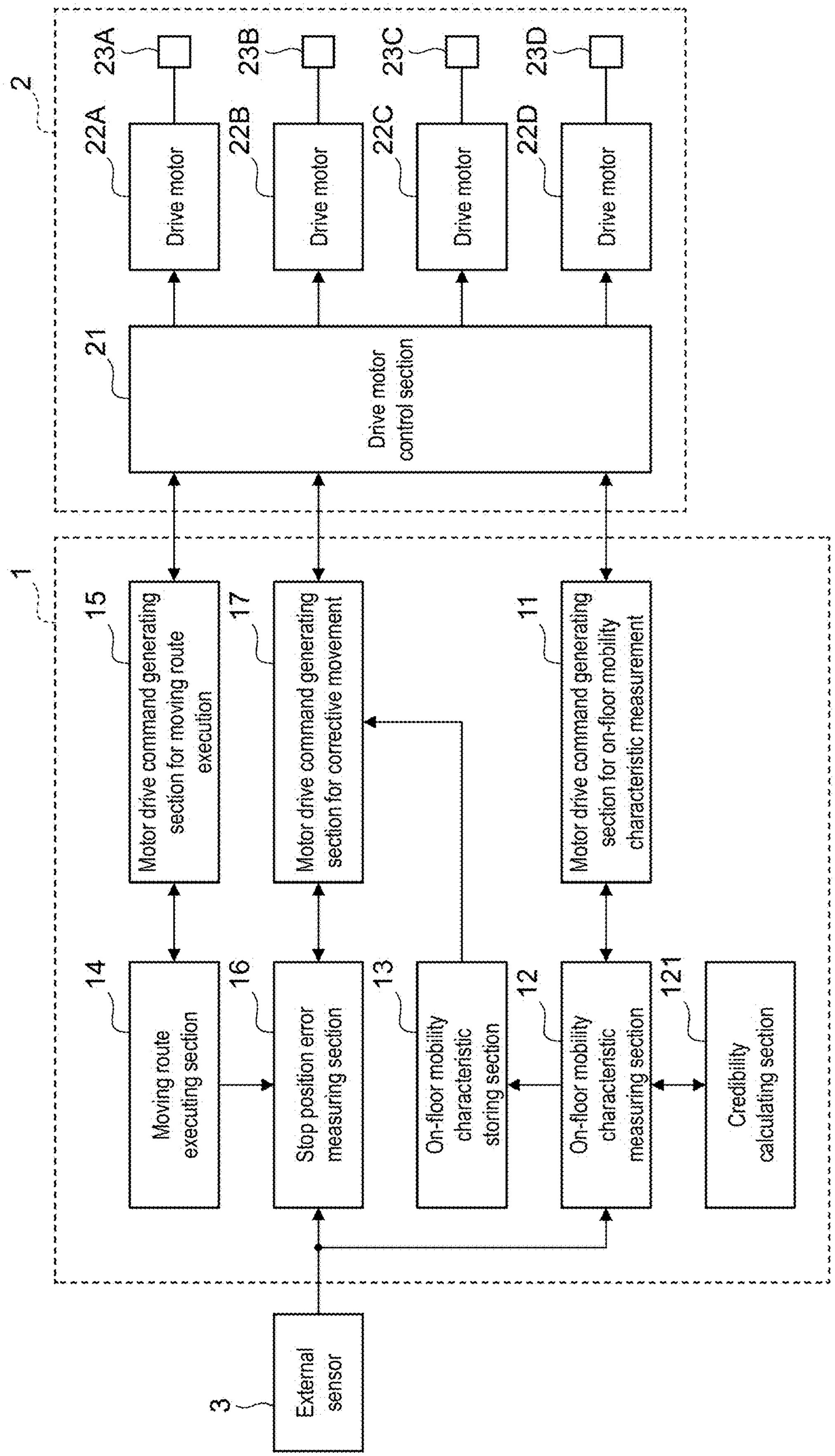
FIG. 13 is a block diagram showing the configuration of the control device 1 for the omnidirectional vehicle according to Embodiment 5 of the present invention.
Figure 14:
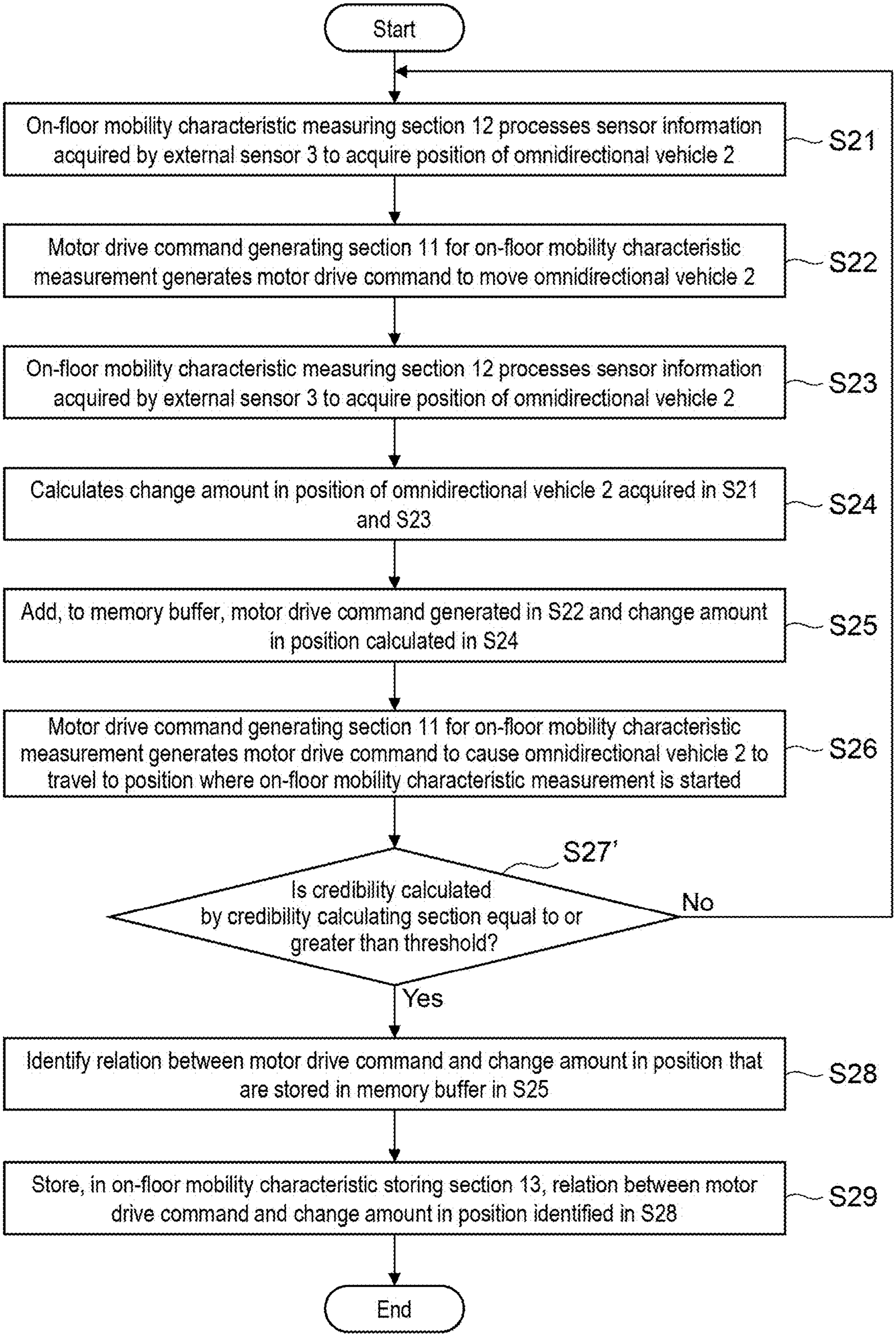
FIG. 14 is a flowchart showing a method in which the control device 1 for the omnidirectional vehicle according to Embodiment 5 of the present invention implements the on-floor mobility characteristic measuring function.
Figure 15:
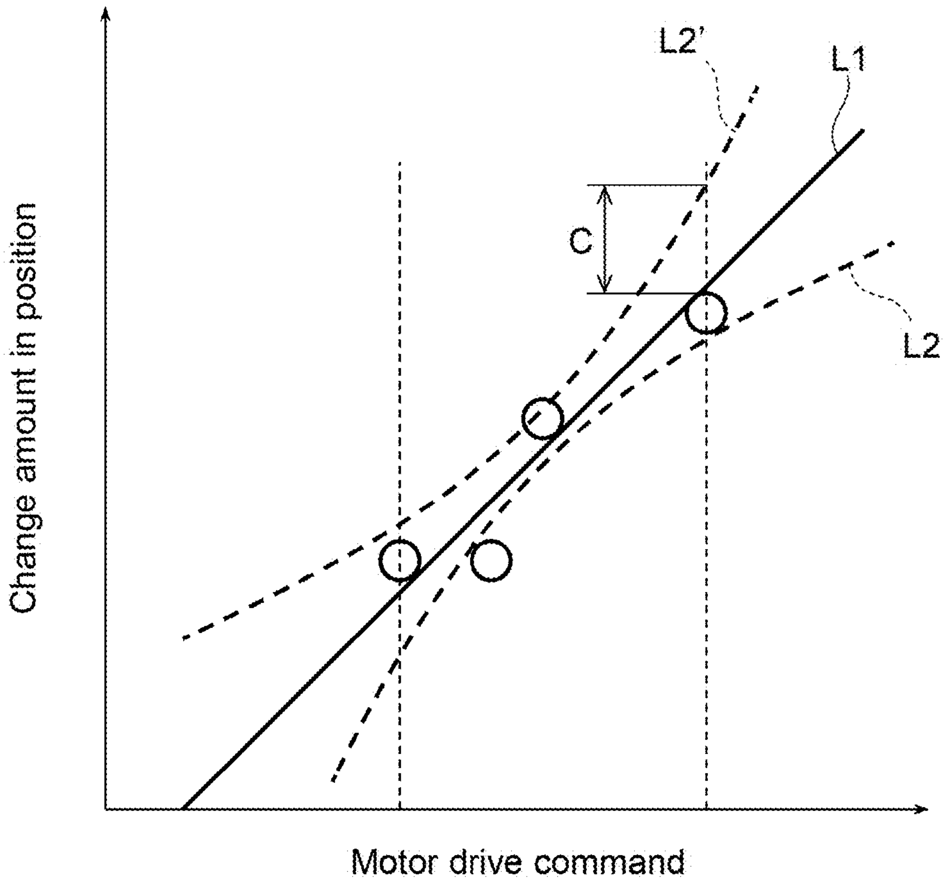
FIG. 15 is a scatter plot for explaining a method in which a credibility calculating section of the control device 1 for the omnidirectional vehicle according to Embodiment 5 of the present invention derives credibility.

FIG. 13 is a block diagram showing the configuration of the control device 1 for the omnidirectional vehicle according to Embodiment 5 of the present invention, FIG. 14 is a flowchart showing a method in which the control device 1 for the omnidirectional vehicle according to Embodiment 5 of the present invention implements the on-floor mobility characteristic measuring function, and FIG. 15 is a scatter plot for explaining a method in which a credibility calculating section 121 for the omnidirectional vehicle according to Embodiment 5 of the present invention derives credibility.

The control device 1 of the present embodiment includes the credibility calculating section 121 in addition to the constituent elements described in Embodiment 1. The on-floor mobility characteristic measurement by the control device 1 requires moving a plurality of times to identify the relation between the motor drive command and the change amount in the position, which requires time. The present embodiment shows the configuration for reducing the required time for the on-floor mobility characteristic measurement. The present embodiment includes the credibility calculating section 121 illustrated in FIG. 13 so as to enable to identify the relation between the motor drive command and the change amount in the position based on the minimum measurement data required.

The credibility calculating section 121 calculates credibility of the on-floor mobility characteristic measured by the on-floor mobility characteristic measuring section 12. The on-floor mobility characteristic measuring section 12 continues measuring the on-floor mobility characteristic until the credibility calculated by the credibility calculating section 121 is equal to or greater than a threshold.

FIG. 14 shows a method for measuring the on-floor mobility characteristic in the present embodiment. The procedures of S21 to S26, S28, and S29 are the same as those of FIG. 5, but the present embodiment is characterized in that as a condition for stopping the travel for measuring the on-floor mobility characteristic, a comparison result between the credibility calculated by the credibility calculating section and the threshold is used (S27'). The credibility is a function having a characteristic of increasing as the number of measurement data increases. The credibility is, for example, a width in a credibility zone in a regression analysis illustrated in FIG. 15.

FIG. 15 shows a graph of the plotted relation between the motor drive command and the change amount in the position. Here, the motor drive command is, for example, a value obtained by integrating a speed command value of the brushless motor that is the drive motor of the omnidirectional vehicle 2 that travels in the front-back direction. When linearity is confirmed between the motor drive command and the change amount in the position, an approximate straight line L1 can be obtained using the least squares method. Further, for example, by calculating a 95% credibility zone relative to the obtained data, an upper limit value L2 and a lower limit value L2' in the credibility zone can be plotted. When the maximum value of the difference between L2 or L2' and L1 in the measured data is set as C, C decreases as the number of data increases.

Therefore, the inverse number of C can be used as an indicator of the credibility. When the inverse number of C exceeds a predetermined value, that is, when the credibility is equal to or greater than a preset threshold, measuring the on-floor mobility characteristic is stopped so that the required time for the on-floor mobility characteristic measurement can be reduced while maintaining the high stop accuracy for the omnidirectional vehicle.

Embodiment 6

Figure 16:
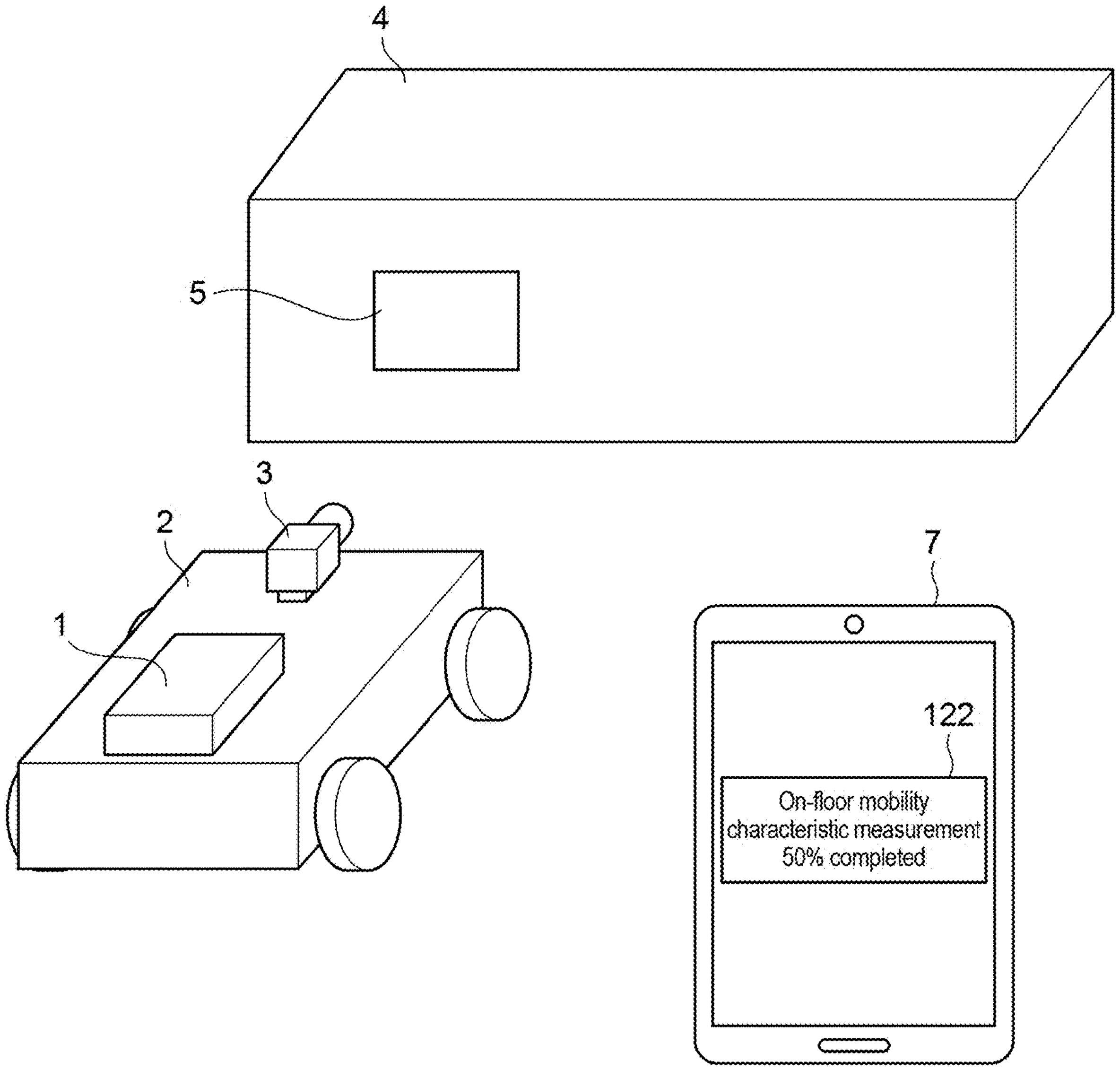
FIG. 16 is a view for showing a state in which an on-floor mobility characteristic measurement progress displaying section of the control device 1 for the omnidirectional vehicle according to Embodiment 6 of the present invention displays a progress of the on-floor mobility characteristic measurement.

FIG. 16 is a view for showing a state in which an on-floor mobility characteristic measurement progress displaying section of the control device 1 for the omnidirectional vehicle according to Embodiment 6 of the present invention displays a progress of the on-floor mobility characteristic measurement.

Since the on-floor mobility characteristic measurement by the control device 1 requires moving a plurality of times to identify the relation between the motor drive command and the change amount in the position, the user needs to wait for completion of the on-floor mobility characteristic measurement. At this time, if the user does not know the progress of the on-floor mobility characteristic measurement, difficulty in work planning on the on-floor mobility characteristic measurement arises as a problem. In order to prevent such a problem, as shown in FIG. 16, the present embodiment includes an on-floor mobility characteristic measurement progress displaying section 122 that displays a time or a progress until completion of measurement while the on-floor mobility characteristic measuring section 12 measures the on-floor mobility characteristic.

In the present embodiment, the control device 1 exchanges information with the tablet terminal 7 that the user has, using a wireless communication means (not shown). Further, it is possible to cause the on-floor mobility characteristic measurement progress displaying section 122 of the tablet terminal 7 to display the time or the progress until completion of the measurement.

Figure 17:
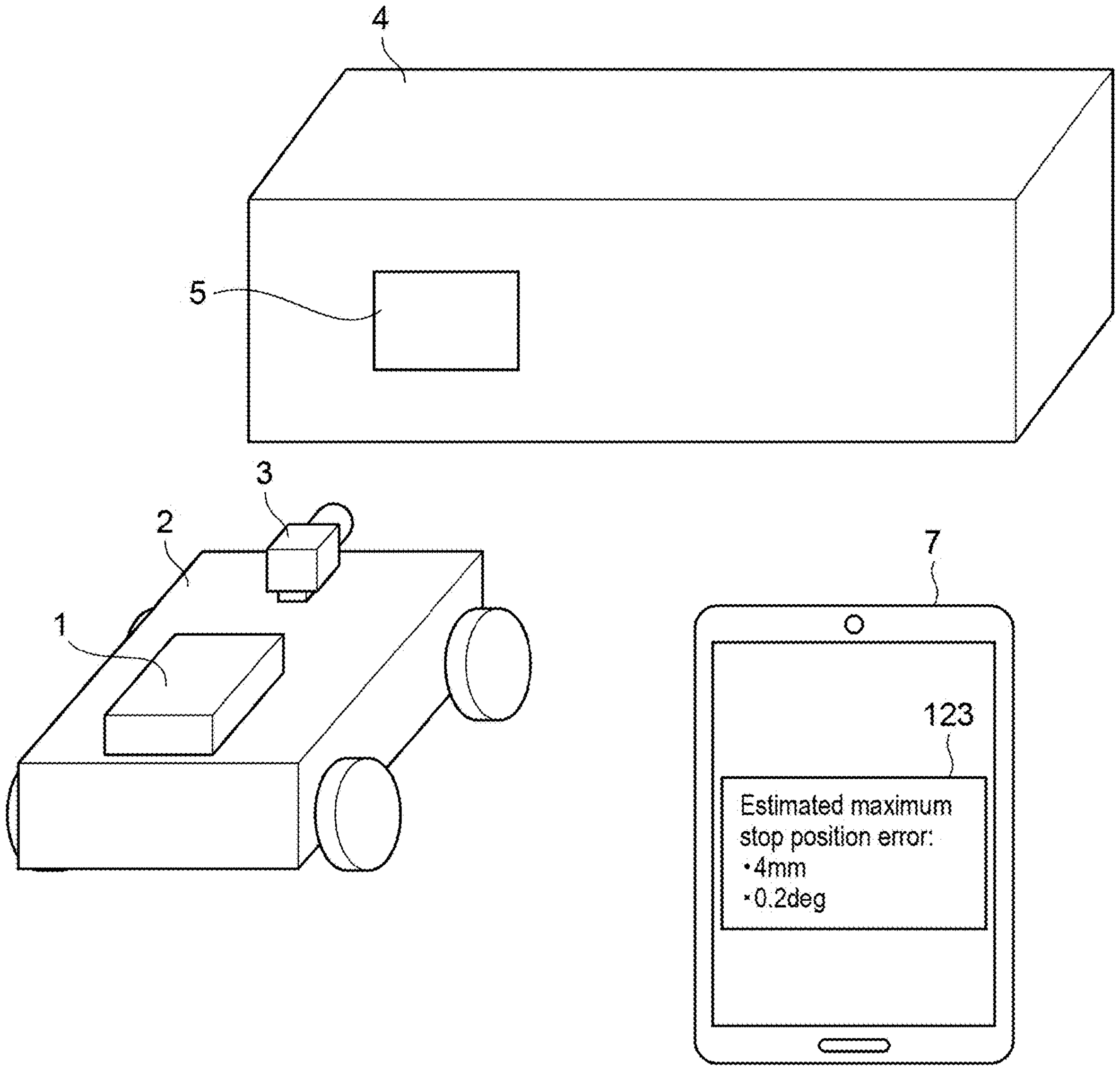
FIG. 17 is a view for showing a state in which an estimated maximum stop position error displaying section of the control device 1 for the omnidirectional vehicle according to Embodiment 6 of the present invention displays an estimated maximum stop position error.

FIG. 17 is a view for showing a state in which an estimated maximum stop position error displaying section of the control device 1 for the omnidirectional vehicle according to Embodiment 6 of the present invention displays an estimated maximum stop position error.

When a user can recognize to what extent the stop accuracy on the target floor surface can be realized as a result of the on-floor mobility characteristic measured by the control device 1, the user easily designs the work to be implemented by the omnidirectional vehicle 2 by having the stop accuracy as a benchmark. Considering such a need, as shown in FIG. 17, the present embodiment includes an estimated maximum stop position error displaying section 123 that displays a maximum stop position error that is estimated from the measurement result after the on-floor mobility characteristic is measured.

The method for calculating the estimated maximum stop position error includes, as shown in FIG. 15, a method in which a standard deviation between the approximate straight line L1 of data obtained during the on-floor mobility characteristic measurement and an actual measurement result is multiplied by a predetermined safety factor and the like. In the present embodiment, the control device 1 exchanges information with the tablet terminal 7 that the user has, using a wireless communication means (not shown). Further, the control device 1 causes the estimated maximum stop position error displaying section 123 of the tablet terminal 7 to display the estimated maximum stop position error.

[Configuration of Computer 1000 to Implement Control Device 1]

Figure 18:
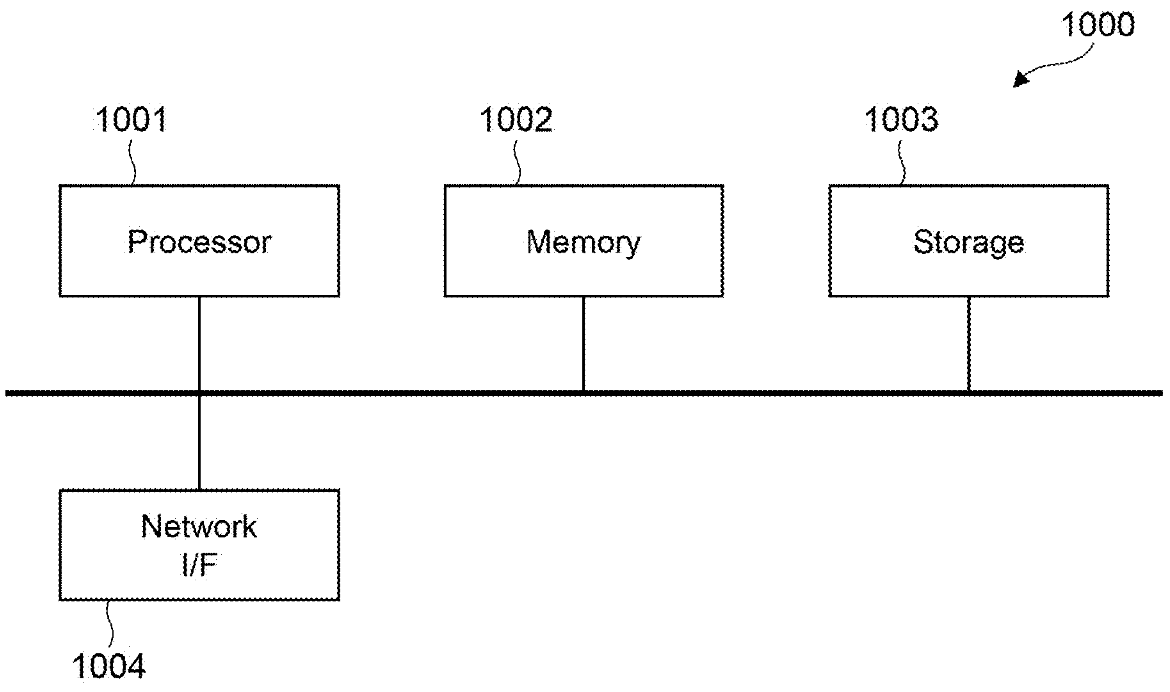
FIG. 18 is a block diagram showing the configuration of a computer 1000 that implements the control device 1.

FIG. 18 is a diagram showing a configuration example of a computer 1000 that implements the control device 1.

In the computer 1000, a processor 1001, a memory 1002 such as a RAM (Random Access Memory), a storage 1003 such as an SSD (Solid State Drive) and an HDD (Hard Disk Drive), and a network I/F (Inter/Face) 1004 are connected via buses.

The embodiments of the present invention have been described in detail above, but the present invention is not limited to the aforementioned embodiments, and various design changes can be made in a range without departing from the gist of the present invention described in the claims. For example, the aforementioned embodiments have been described in detail for easier understanding of the present invention, and are not necessarily limited to those including all the configurations. Further, it is possible to replace a part of the configuration of one embodiment with the configuration of the other embodiment and to add the configuration of one embodiment to the configuration of the other embodiment. Furthermore, for a part of the configuration of each embodiment, addition of and replacement with other configurations and deletion are available.

DESCRIPTION OF SYMBOLS

- 1 Control device
- 2 Omnidirectional vehicle
- 3 External sensor
- 4 Surrounding structure
- 5 Position measurement marker
- 6 Position estimation sensor
- 11 Motor drive command generating section for on-floor mobility characteristic measurement
- 12 On-floor mobility characteristic measuring section
- 13 On-floor mobility characteristic storing section
- 14 Moving route executing section
- 15 Motor drive command generating section for moving route execution
- 16 Stop position error measuring section
- 17 Motor drive command generating section for corrective movement
- 18 Position estimating section
- 19 Stop accuracy monitoring section
- 21 Drive motor control section
- 22A to 22D Drive motor
- 23A to 23D Omnidirectional wheel
- 111 Motor command storing section for front-back directional measurement
- 112 Motor command storing section for left-right directional measurement
- 113 Motor command storing section for turning directional measurement
- 121 Credibility calculating section
- 122 On-floor mobility characteristic measurement progress displaying section

What is claimed is:

1. A control device for an omnidirectional vehicle, the control device being adapted to move the omnidirectional vehicle to a target stop position of the omnidirectional vehicle and comprising:

a motor drive command generating section for on-floor mobility characteristic measurement that generates a drive command for measuring a mobility characteristic of the omnidirectional vehicle, the mobility characteristic being represented by a relation between the drive command for rotating a drive motor of the omnidirectional vehicle and an actual moving amount;

an on-floor mobility characteristic measuring section that measures the mobility characteristic of the omnidirectional vehicle;

an on-floor mobility characteristic storing section that stores the mobility characteristic of the omnidirectional vehicle measured by the on-floor mobility characteristic measuring section;

a moving route executing section that determines a moving route leading to a target stop position of the omnidirectional vehicle;

a motor drive command generating section for moving route execution that generates a drive command for the drive motor to move the omnidirectional vehicle along the moving route determined by the moving route executing section;

a stop position error measuring section that measures an error between the target stop position and a stop position that is actual of the omnidirectional vehicle; and a motor drive command generating section for corrective movement that generates a drive command for each wheel of the omnidirectional vehicle to perform movement for correcting the error in the stop position, based on the error in the stop position measured by the stop position error measuring section and the mobility characteristic stored in the on-floor mobility characteristic storing section.

2. The control device for an omnidirectional vehicle according to claim 1, comprising:

a motor command storing section for front-back directional measurement that stores a speed command for the drive motor to measure a mobility characteristic of a front-back directional movement;

a motor command storing section for left-right directional measurement that stores a speed command for the drive motor to measure a mobility characteristic of a left-right directional movement; and a motor command storing section for turning directional measurement that stores a speed command for the drive motor to measure a mobility characteristic of a turning directional movement, wherein the motor drive command generating section for on-floor mobility characteristic measurement separately outputs motor commands that are stored in the motor command storing section for front-back directional measurement, the motor command storing section for left-right directional measurement, and the motor command storing section for turning directional measurement.

3. The control device for an omnidirectional vehicle according to claim 1, comprising a position estimating section that estimates a current position of the omnidirectional vehicle, wherein the on-floor mobility characteristic storing section stores an on-floor mobility characteristic so as to be associated with a position of the omnidirectional vehicle when the on-floor mobility characteristic is measured, and the motor drive command generating section for corrective movement generates a motor drive command for corrective movement using the on-floor mobility characteristic measured at a position closest to the target stop position.

4. The control device for an omnidirectional vehicle according to claim 1, comprising a stop accuracy monitoring section configured to:

acquire, after corrective movement, the error in the stop position that is output by the stop position error measuring section;

compare the error in the stop position with a predetermined threshold; and notify that the on-floor mobility characteristic at the position is measured when the error in the stop position is greater than the threshold.

5. The control device for an omnidirectional vehicle according to claim 1, comprising a credibility calculating section that calculates credibility of an on-floor mobility characteristic measured by the on-floor mobility characteristic measuring section, wherein the on-floor mobility characteristic measuring section stops measuring the on-floor mobility characteristic when the credibility calculated by the credibility calculating section is equal to or greater than a threshold.

6. The control device for an omnidirectional vehicle according to claim 1, comprising an on-floor mobility characteristic measurement progress displaying section that displays a time or a progress until completion of measurement while the on-floor mobility characteristic measuring section measures an on-floor mobility characteristic.

7. The control device for an omnidirectional vehicle according to claim 1, comprising an estimated maximum stop position error displaying section that displays a maximum stop position error that is estimated from a measurement result after an on-floor mobility characteristic is measured.

* * * * *